(12) United States Patent
Obayashi et al.

(10) Patent No.: US 9,810,312 B2
(45) Date of Patent: Nov. 7, 2017

(54) PLANETARY GEAR DEVICE

(71) Applicant: KAWASAKI JUKOGYO KABUSHIKI KAISHA, Kobe-shi, Hyogo (JP)

(72) Inventors: Katsuyoshi Obayashi, Kakogawa (JP); Yoshihiro Yamasaki, Kobe (JP); Yoshiyuki Noguchi, Akashi (JP); Hidenori Arisawa, Kakogawa (JP); Seiji Yamashita, Kobe (JP)

(73) Assignee: KAWASAKI JUKOGYO KABUSHIKI KAISHA, Hyogo, Kobe-shi (JP)

( * ) Notice: Subject to any disclaimer, the term of this patent is extended or adjusted under 35 U.S.C. 154(b) by 0 days.

(21) Appl. No.: 15/086,727

(22) Filed: Mar. 31, 2016

(65) Prior Publication Data

US 2016/0208905 A1    Jul. 21, 2016

Related U.S. Application Data

(63) Continuation of application No. PCT/JP2014/076062, filed on Sep. 30, 2014.

(30) Foreign Application Priority Data

Oct. 1, 2013    (JP) .................................. 2013-206144

(51) Int. Cl.
    *F16H 57/04*    (2010.01)
    *F16H 1/28*    (2006.01)

(52) U.S. Cl.
    CPC ........... *F16H 57/0427* (2013.01); *F16H 1/28* (2013.01); *F16H 57/0456* (2013.01);
    (Continued)

(58) Field of Classification Search
    CPC ............ F16H 57/0427; F16H 57/0456; F16H 57/0479; F16H 57/0482; F16H 57/0486; F16H 57/04
    See application file for complete search history.

(56) References Cited

U.S. PATENT DOCUMENTS 8,747,272 B2    6/2014    Imai et al.
8,777,792 B2    7/2014    Imai et al.
(Continued)

FOREIGN PATENT DOCUMENTS

CN    202040282 U    11/2011
CN    102278424 A    12/2011
(Continued)

OTHER PUBLICATIONS

Notification of Reasons for Rejection of Japanese Application No. 2013-206144 dated Jun. 17, 2014.
(Continued)

*Primary Examiner* — Huan Le
(74) *Attorney, Agent, or Firm* — Sughrue Mion, PLLC (57) ABSTRACT

A planetary gear device includes: a sun gear; a plurality of planet gears that mesh with the sun gear; and a baffle unit disposed in a circumferential gap between the adjacent planet gears. The baffle unit includes: a first introduction opening portion open in a radially inward direction to introduce lubricating oil, which has lubricated the sun gear and the planet gears, into the baffle unit; an end wall forming one end in an axial direction of the first introduction opening portion; a discharge opening portion to discharge lubricating oil in the baffle unit; and a guide portion disposed at a side portion of the baffle unit on a rear side in rotation direction of the sun gear, and configured to cover the first introduction
(Continued)

opening portion in the circumferential direction and to guide the lubricating oil to an outer circumference of the adjacent planet gears.

13 Claims, 6 Drawing Sheets

(52) U.S. Cl.
CPC ..... *F16H 57/0479* (2013.01); *F16H 57/0482* (2013.01); *F16H 57/0486* (2013.01)

(56) References Cited

U.S. PATENT DOCUMENTS

| | | | |
|---|---|---|---|
| 8,820,478 | B2 | 9/2014 | Gauthier et al. |
| 2009/0247348 | A1 | 10/2009 | Haupt et al. |
| 2011/0299974 | A1 | 12/2011 | Gauthier et al. |
| 2013/0095974 | A1 | 4/2013 | Imai et al. |
| 2013/0102432 | A1* | 4/2013 | Imai .................. F16H 57/0409 475/159 |

FOREIGN PATENT DOCUMENTS

| | | | |
|---|---|---|---|
| CN | 202195008 U | | 4/2012 |
| EP | 2 559 914 A1 | | 2/2013 |
| JP | 62-049052 U | | 3/1987 |
| JP | 6-1889 | * | 1/1994 |
| JP | 6-1889 U | | 1/1994 |
| JP | 06-047764 U | | 6/1994 |
| JP | 7-332475 A | | 12/1995 |
| JP | 10-318356 A | | 12/1998 |
| JP | 2011-220495 A | | 11/2011 |
| JP | 4948620 B2 | | 6/2012 |
| JP | 2012-518130 A | | 8/2012 |

OTHER PUBLICATIONS

Decision of Grant of Japanese Application No. 2013-206144 dated Jan. 20, 2015.
International Search Report of PCT/JP2014/076062 dated Dec. 22, 2014.
International Preliminary Report on Patentability dated Apr. 14, 2016 from the International Bureau issued in PCT/JP2014/076062.
Communication dated Apr. 28, 2017 from the European Patent Office in counterpart Application No. 14850545.6.
Communication dated May 22, 2017 from the State Intellectual Property Office of the P.R.C., in counterpart Chinese application No. 201480053307.6.
Communication dated Mar. 13, 2017, from the Canadian Patent Office in counterpart application No. 2,925,382.

* cited by examiner

PLANETARY GEAR DEVICE

CROSS REFERENCE TO THE RELATED APPLICATION

This application is a continuation application, under 35 U.S.C. §111(a), of international application No. PCT/JP2014/076062, filed Sep. 30, 2014, which claims priority to Japanese patent application No. 2013-206144, filed Oct. 1, 2013, the disclosure of which are incorporated by reference in their entirety into this application.

BACKGROUND OF THE INVENTION

Field of the Invention

The present invention relates to planetary gear devices that are used for power transmission mechanisms for general industrial machinery, aircrafts, and the like, and that include a structure for distributing lubricating oil flow.

Description of Related Art

In recent years, one of the key issues in general machinery is to reduce fuel consumption from the viewpoint of reduction in operation cost and environmental conservation. Therefore, also for planetary gear devices for use in aircraft engines, reduction in power loss is required.

Conventionally, this type of planetary gear device includes a mechanism for supplying lubricating oil to gears in order to lubricate and cool the gears. However, one of main causes of power loss in the planetary gear device is stirring resistance of supplied lubricating oil. The stirring resistance of lubricating oil is proportional to the third power of a circumferential speed of a gear. Therefore, the stirring resistance becomes too high to be ignored in gears having high circumferential speeds. One example of a technique for reducing such stirring resistance of lubricating oil is disclosed in Patent Document 1. According to Patent Document 1, baffle units are provided in circumferential gaps formed between a plurality of planet gears to introduce, into the baffle units, excess lubricating oil that is generated around the adjacent planet gears after lubrication, and discharge the excess lubricating oil to the outside of the gear device. Thus, the stirring resistance of the lubricating oil is reduced, whereby power loss is reduced.

RELATED DOCUMENT

Patent Document

[Patent Document 1] JP Patent No. 4948620

SUMMARY OF THE INVENTION

However, in the planetary gear device disclosed in Patent Document 1, excess lubricating oil is left adhered between adjacent planet gears after lubricating a sun gear or the planet gears, and cannot be sufficiently removed from tooth surfaces of the gears. Therefore, a technique for effectively removing the lubricating oil from the tooth surfaces to sufficiently reduce stirring resistance of the lubricating oil is required.

An object of the present invention is to provide a planetary gear device that allows lubricating oil to be efficiently removed from a train of gears and allows reduction of stirring resistance of the lubricating oil such that power loss is reduced so as to be low.

In order to attain the aforementioned object, a planetary gear device having a structure for distributing lubricating oil flow according to the present invention includes: a sun gear having external teeth; a plurality of planet gears that have external teeth and mesh with the sun gear; a ring gear that has internal teeth and meshes with the planet gears; and a baffle unit disposed in a circumferential gap defined between the planet gears adjacent to each other. The baffle unit includes: a first introduction opening portion that is open in a radially inward direction, and configured to introduce lubricating oil, which has lubricated tooth surfaces of the sun gear and the planet gears, into the baffle unit; a radially outer end wall that is disposed in the vicinity of a radially inner side of the ring gear; and an end wall disposed at one end portion of the radially outer end wall and forming one end, in an axial direction, of the first introduction opening portion. The baffle unit further includes a discharge opening portion to discharge the lubricating oil in the baffle unit; and a guide portion disposed at least at a side portion of the baffle unit on a rear side in a rotation direction of the sun gear, and configured to cover the first introduction opening portion in the circumferential direction, and to guide the lubricating oil into the first introduction opening portion. In the description herein, the "axial direction" refers to an axial direction of the planetary gear device, that is, an axial direction of the sun gear disposed at the center portion of the planetary gear device, and the "radial direction" refers to a direction orthogonal to the axial direction of the sun gear.

In this configuration, excess lubricating oil is introduced, through the first introduction opening portion of the baffle unit disposed between the adjacent planet gears, into the baffle unit after the sun gear and the planet gears are lubricated. The lubricating oil introduced into the baffle unit is smoothly discharged through the discharge opening portion to the outside. Thus, it is possible to reduce stirring resistance caused by the excess lubricating oil being accumulated at the tooth surfaces of the adjacent planet gears and at a portion therearound after a train of gears is lubricated, and flows of the lubricating oil interfering with each other. As a result, power loss can be effectively reduced. The guide portion is provided at least at a side portion on a rear side in a rotation direction of the sun gear so as to cover the first introduction opening portion in the circumferential direction, so that excess lubricating oil can be smoothly introduced into the first introduction opening portion by the guide portion after a portion in which the sun gear and each planet gear mesh with each other is lubricated. Movement of the lubricating oil along the tooth surface of the ring gear after lubrication of a portion in which the planet gear and the ring gear mesh with each other, is prevented by the radially outer end wall disposed in the vicinity of the ring gear. Thus, stirring resistance is further reduced.

In the planetary gear device of the present invention, a housing or a rotary shaft of the sun gear may have a supply opening to supply the lubricating oil to the tooth surface of the sun gear. In this case, a circumferential width of the first introduction opening portion is set so as to be greater than a minimum gap between two planet gears adjacent to each other. In this configuration, a supply opening for the lubricating oil need not be provided in the baffle unit. Therefore, an internal space of the baffle unit can be effectively used for collecting the lubricating oil. The width, in the circumferential direction, of the first introduction opening portion is greater than the minimum gap between the planet gears, whereby the lubricating oil that flows radially outward through between the planet gears can be effectively introduced through the first introduction opening portion into the baffle unit.

For example, the first introduction opening portion may be disposed in the vicinity of an arrangement pitch circle of the planet gears. In the description herein, the "vicinity" is defined as a region having a diameter that is 0.8 to 1.2 times the diameter of the arrangement pitch circle. In the vicinity of the arrangement pitch circle, a distance between the two adjacent planet gears is greater than the minimum gap, and the portion in the vicinity thereof is not distant from the sun gear. Therefore, the lubricating oil can be effectively introduced into the baffle unit through the first introduction opening portion disposed in the vicinity thereof after the sun gear is lubricated.

In the planetary gear device of the present invention, the baffle unit may have a second introduction opening portion formed on a radially inner side of the radially outer end wall, and at a side portion on a front side in a rotation direction of the sun gear. In this configuration, excess lubricating oil adhering to the tooth surfaces of the planet gears can be introduced into the baffle unit also through the second introduction opening portion after the portion in which each planet gear and the ring gear mesh with each other is lubricated, thereby enhancing an effect of collecting the lubricating oil.

In the planetary gear device of the present invention, a distributor member disposed on the front side in the rotation direction of the sun gear and configured to guide the lubricating oil along an outer circumference of the planet gear that is adjacent thereto may be provided, and the second introduction opening portion may be formed between the distributor member and the radially outer end wall. In this configuration, the lubricating oil can be smoothly introduced into the second introduction opening portion by the distributor member and effectively collected into the baffle unit after the portion in which each planet gear and the ring gear mesh with each other is lubricated.

In the planetary gear device of the present invention, the end wall of the baffle unit may be formed with a support portion configured to support a rotary shaft that is disposed so as to be concentric with the sun gear and rotates integrally with the ring gear. In this configuration, the rotary shaft is supported by the support portion formed in the end wall of the baffle unit, so that a bearing for supporting the rotary shaft need not be separately provided, thereby simplifying the structure.

The planetary gear device of the present invention may further include a housing that accommodates the sun gear, the planet gears, and the ring gear, in which the discharge opening portion is formed in the end wall, and the other end portion of the radially outer end wall is provided with an attaching wall connected to the housing. In this configuration, the end wall has the support portion, and thus has an increased dimension in the radial direction. Therefore, the discharge opening portion formed in the end wall can be increased to easily discharge the lubricating oil. The baffle unit is stably supported by the housing at the attaching wall.

The planetary gear device of the present invention may further include a housing that accommodates the sun gear, the planet gears, and the ring gear, and the discharge opening portion may be formed at the other end portion of the radially outer end wall. Thus, the lubricating oil in the baffle unit can be smoothly discharged to the outside.

The planetary gear device of the present invention may further include a housing that accommodates the sun gear, the planet gears, and the ring gear, and the discharge opening portion may be formed in a portion, of the housing, corresponding to an inner side, in the radial direction, of the other end portion of the radially outer end wall of the baffle unit.

In this configuration, the housing does not rotate and is stationary, whereby the lubricating oil in the baffle unit can be smoothly discharged through the discharge opening portion formed in the housing to the outside of the baffle unit.

The planetary gear device of the present invention may further include: a ring member having an inner circumferential surface formed with the ring gear; and a housing that accommodates the ring member, the sun gear, the planet gears, and the ring gear, in which the ring member has an outlet hole to guide the lubricating oil discharged through the discharge opening portion of the baffle unit to outside of the ring member. In this configuration, the lubricating oil discharged through the discharge opening portion of the baffle unit, is guided into the housing through the outlet hole of the ring member, whereby the lubricating oil is not accumulated in the ring member. Therefore, stirring resistance of the lubricating oil caused by the rotation of the ring member can be reduced.

The planetary gear device of the present invention may further include a housing that accommodates the sun gear, the planet gears, and the ring gear, and the housing may include: a nozzle configured to inject the lubricating oil toward the tooth surface of the sun gear; and a supply passage to supply the lubricating oil to a bearing of the planet gear. In this configuration, the housing does not rotate and is stationary, so that the lubricating oil can be constantly and stably injected to the tooth surface of the sun gear from the nozzle provided in the housing. Similarly, the lubricating oil can be constantly and stably supplied to the bearing of each planet gear by the supply passage, provided in the housing, for supplying the lubricating oil.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
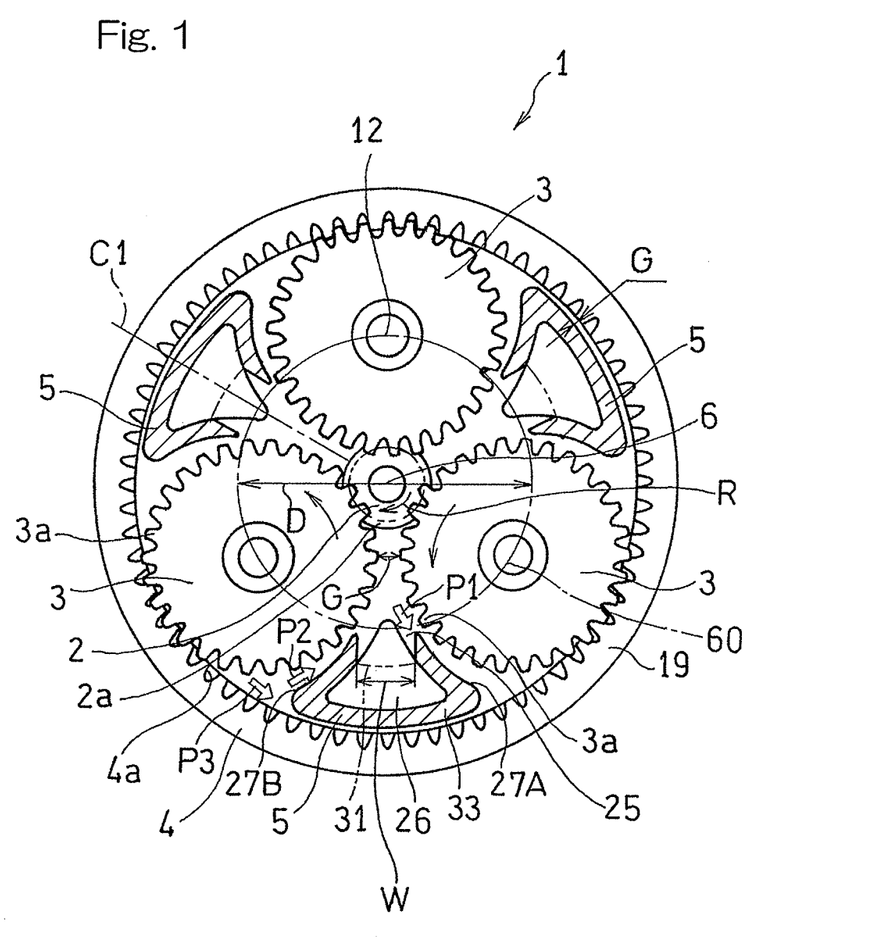
FIG. 1 is a front view of a planetary gear device having a structure for distributing lubricating oil flow according to a first embodiment of the present invention.

Hereinafter, a first embodiment of the present invention will be described with reference to FIG. 1 to FIG. 5. A planetary gear device 1 shown in FIG. 1 is mounted to a general industrial machine, an aircraft engine, or the like, and transmits power of an input shaft to an output side. Hereinafter, an input side in the axial direction of the planetary gear device 1 is referred to as a front side, and the output side opposite to the input side is referred to as a rear side.

The planetary gear device 1 includes a sun gear 2 disposed at the center portion and having external teeth 2a, a plurality of planet gears 3 disposed on an outer periphery of the sun gear 2, each having external teeth 3a, a ring gear 4 disposed on an outer periphery of a train of the planet gears, having internal teeth 4a, and baffle units 5 each disposed in a circumferential gap defined between the planet gears 3 and 3 adjacent to each other. The sun gear 2 is formed as a spur gear on the outer periphery of an input shaft 6 that is a rotary shaft. The planet gears 3 are formed as spur gears that correspond to the sun gear 2, and mesh with the sun gear 2. In the present embodiment, the three planet gears 3 are equally spaced from each other in the circumferential direction of the sun gear 2. The ring gear 4 is formed as a spur gear and meshes with the three planet gears 3.

Figure 2:
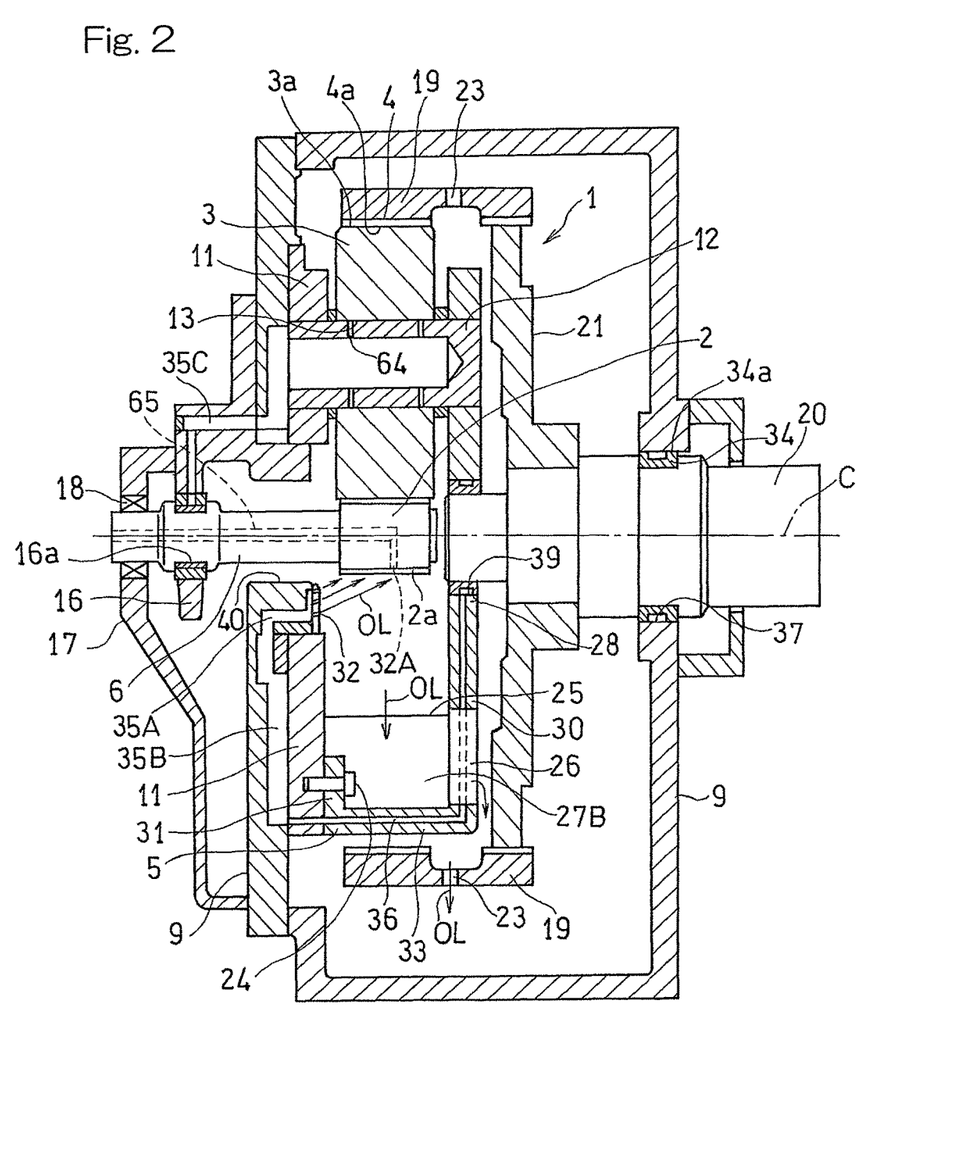
FIG. 2 is a longitudinal cross-sectional view illustrating the planetary gear device which is applied to an output device.

As shown in FIG. 2, the sun gear 2, the planet gears 3, the ring gear 4, and the baffle units 5 which form the planetary gear device 1 are accommodated in a housing 9. To the housing 9, a planet gear support plate 11 is fixed. A base end portion (left side that is the input side in FIG. 2) of a hollow planet shaft 12 is attached to the planet gear support plate 11 such that the planet shaft 12 and the planet gear support plate 11 are not rotatable relative to each other. Each planet gear 3 is supported on the outer periphery of the planet shaft 12 through a slide bearing 13 such that the planet gear 3 and the planet shaft 12 are rotatable relative to each other. An end portion of the planet shaft 12 is supported by an end wall 30, which will be described below, attached to the housing 9 through the planet gear support plate 11.

The input shaft 6 extends from the outside of the housing 9 through a through-hole 40 in the housing 9. A portion of the input shaft 6 outside the through-hole 40 is supported by a slide bearing 16a provided in a first support casing 16 that is a part of the housing 9 such that the input shaft 6 is rotatable relative to the first support casing 16. A base end portion (the left end portion in FIG. 2) of the input shaft 6 that extends beyond the slide bearing 16a penetrates through a second support casing 17 that is a part of the housing 9, and is sealed by a sealing member 18 supported by the second support casing 17.

The ring gear 4 is formed on an inner circumferential surface of a ring member 19. An output shaft 20 that is a rotary shaft is disposed on an axis C common to the input shaft 6, and a rotary plate 21 is fixed to the output shaft 20. An outer circumferential end portion of the rotary plate 21 and the ring member 19 are connected by means of gears, and the rotary plate 21 and the ring member 19 integrally rotate. A slide bearing 34 is fixed to an outer circumference of the output shaft 20. The slide bearing 34 penetrates through a through-hole 37 formed at the center portion of the housing 9, and rotatably contacts with the housing 9 through a cylindrical sliding surface 34a.

Each baffle unit 5 is disposed between the two planet gears 3 and 3 adjacent to each other in the circumferential direction in FIG. 1, and is attached to the planet gear support plate 11 shown in FIG. 2 via a fastening member 24 such as a bolt.

Figure 3:
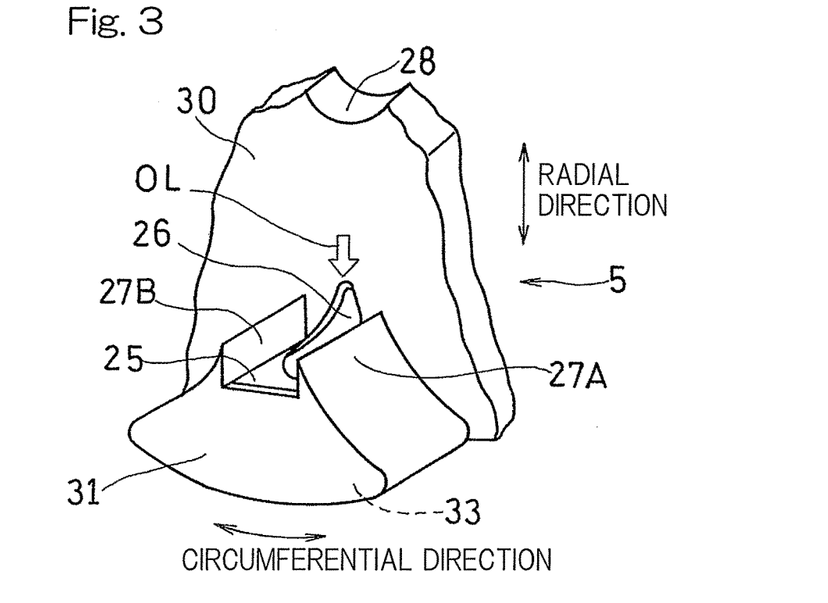
FIG. 3 is a perspective view of a baffle unit used in the first embodiment.

As shown in FIG. 3, each baffle unit 5 is specifically structured to have a first introduction opening portion 25 that is open in the radially inward direction, and introduce a lubricating oil OL, which has lubricated the tooth surfaces 2a and 3a of the sun gear 2 and the planet gears 3 shown in FIG. 2, through the first introduction opening portion 25 into the baffle unit 5. Each baffle unit 5 includes the end wall 30 on the rear side in the axial direction, an attaching wall 31 on the front side in the axial direction; and a radially outer end wall 33. The radially outer end wall 33 is shaped in the form of an arc of a circle that is substantially concentric with the ring gear 4 formed on the inner circumferential surface of the ring member 19. The end wall 30 is connected to one end portion of the radially outer end wall 33 on the rear side, that is, on the output shaft 20 side in the axial direction. The attaching wall 31 is disposed at the other end portion of the radially outer end wall 33 on the front side, that is, on the input shaft 6 side in the axial direction. In other words, the end wall 30 and the attaching wall 31 are disposed on both end portions, in the axial direction, of the radially outer end wall 33, and respectively form opposite axial ends of the first introduction opening portion 25.

The end wall 30 is disk-shaped, and is an end wall shared by the three baffle units 5. The end wall 30 may be provided for each baffle unit 5, and a support wall for supporting the end portion of the planet shaft 12 may be provided separately from the end wall 30. The shape of the radially outer end wall 33 as viewed in the axial direction, is not limited to an arc shape, and may be a linear shape.

The end wall 30 that is disposed on the one end side, in the axial direction, of the radially outer end wall 33, that is, on the output shaft 20 side thereof in FIG. 2, has a discharge opening portion 26 through which the lubricating oil OL in the baffle unit 5 is discharged in the axially outward direction. The discharge opening portion 26 is disposed so as to axially confront the rotary plate 21. The ring member 19 has an outlet hole 23 formed as an outlet passage to guide the lubricating oil OL, which has been discharged through the discharge opening portion 26 of the baffle unit 5, radially outward of the ring member 19. The lubricating oil OL discharged through the discharge opening portion 26 flows through a passage between the end wall 30 and the rotary plate 21 toward the outlet hole 23. As shown in FIG. 1, each baffle unit 5 has a shape that is bilaterally symmetric with respect to a center line C1 that extends in the radial direction.

The other end portion of the radially outer end wall 33 shown in FIG. 2 is attached to the housing 9 through the attaching wall 31. Specifically, the attaching wall 31 is fixed to the housing 9 through the fastening member 24 such as a bolt. Guide portions 27A, 27B are provided on both side portions of each baffle unit 5 shown in FIG. 1 so as to cover the first introduction opening portion 25 in the circumferential direction. By the guide portions 27A, 27B, the lubricating oil OL is guided into the first introduction opening portion 25. Thus, a space in which the lubricating oil OL is stored is formed, in the baffle unit 5, by the end wall 30, the attaching wall 31, both the guide portions 27A, 27B, and the radially outer end wall 33.

The end portions, that is, the radially inner ends, of the guide portions 27A, 27B which form the first introduction opening portion 25, are disposed in the vicinity of an arrangement pitch circle 60 formed by the center of each planet gear 3 being connected. In the embodiment shown in FIG. 1, the end portions of the guide portions 27A, 27B are disposed slightly radially outward of the arrangement pitch circle 60 and on a diameter that is 1.05 times the diameter D of the arrangement pitch circle 60. A width W, in the circumferential direction, of the first introduction opening portion 25 is set so as to be greater than a minimum gap G between the two planet gears 3 and 3 adjacent to each other.

The end wall 30 that forms a part of the baffle unit 5 shown in FIG. 2 extends radially inward of the attaching wall 31 and the guide portions 27A, 27B from the radially outer end wall 33. A support portion 28 is formed as a round hole that penetrates through the end wall 30 at the radially center portion thereof, and the rotary shaft 20 shown in FIG. 2 is rotatably supported through a slide bearing 39 by the support portion 28.

As shown in FIG. 1, the radially outer end wall 33 of each baffle unit 5 is disposed in the vicinity of the radially inner side of the ring gear 4, and a gap G between the wall 33 and the gear 4 is within the range of 2 to 10 mm, and preferably 3 to 7 mm. By the gap G being thus reduced, a large amount of lubricating oil is prevented from entering the gap G and adhering to the ring gear 4.

A plurality of nozzles 32 for injecting the lubricating oil OL toward the tooth surface 2a of the sun gear 2 are formed in the vicinity of and below the through-hole 40 of the housing 9. The housing 9 has a first supply passage 35A for supplying the lubricating oil OL to the nozzles 32, and a second supply passage 35B for supplying the lubricating oil OL to an intra-baffle passage 36 formed in each baffle unit 9.

A nozzle 32A may be formed so as to be open at the tooth bottom of the sun gear 2 as indicated by a dashed line in FIG. 2, instead of the nozzles 32 being provided in the housing 9. In this case, an intra-shaft supply passage 65 for supplying the lubricating oil OL to the nozzle 32A is formed in the input shaft 6.

In the housing 9, a third supply passage 35C for supplying the lubricating oil OL to the slide bearing 16a of the input shaft 6 is formed. To the third supply passage 35C, the lubricating oil OL is supplied from a not-illustrated external lubricating oil supply. The lubricating oil OL flows through the hollow portion of the planet shaft 12 from the second supply passage 35B, and is supplied through a supply hole 64 to the bearing 13.

The lubricating oil OL collected in each baffle unit 5 is discharged into the housing 9 through the discharge opening portion 26, a discharge passage 22, and the outlet hole 23. The lubricating oil OL stored in the bottom portion of the housing 9 is discharged through a discharge passage (not shown) to the outside of the planetary gear device 1.

An operation of the planetary gear device 1 having the structure for distributing the lubricating oil according to the above-described embodiment will be described. The lubricating oil OL is injected from the nozzles 32 shown in FIG. 2 toward the tooth surface 2a of the sun gear 2. The lubricating oil OL injected to the tooth surface 2a of the sun gear 2 adheres to the tooth surfaces 3a of the planet gears 3 that mesh with the sun gear 2, and adheres to the tooth surface 4a of the ring gear 4 that meshes with the planet gears 3. Thus, each gear is lubricated according to rotation of the train of gears.

As shown in FIG. 1, the sun gear 2 rotates clockwise. Therefore, the lubricating oil OL adheres to the planet gear 3 and flows radially outward of the sun gear 2, as indicated by an arrow P1, at a rear side in the rotation direction R of the sun gear 2. The lubricating oil OL is separated from the tooth surface 3a of the planet gear 3 by the end of the guide portion 27A at the rear side in the rotation direction of the sun gear 2, introduced into the first introduction opening portion 25, and collected into the baffle unit 5. The lubricating oil OL, which adheres to the tooth surface 3a of the planet gear 3 which meshes with the sun gear 2 at a front side in the rotation direction R of the sun gear 2, flows as indicated by an arrow P2, and a portion of the lubricating oil OL is then introduced into the first introduction opening portion 25. The lubricating oil OL collected in the baffle unit 5 is discharged through the discharge opening portion 26 shown FIG. 2 from the outlet hole 23 of the ring member 19 into the housing 9. Thus, the lubricating oil OL is not excessively accumulated in the sun gear 2 and the planet gears 3, and is discharged to the outside of the planetary gear device 1. Thus, stirring resistance of the lubricating oil OL is reduced, whereby power loss is reduced.

The lubricating oil OL will flow along the tooth surface 4a of the ring gear 4 as indicated by an arrow P3 after a portion at which the planet gear 3 and the ring gear 4 mesh with each other is lubricated. By the radially outer end wall 33, of the baffle unit 5, disposed in the vicinity of the ring gear 4, most of the lubricating oil OL is prevented from moving along the tooth surface 4a of the ring gear 4. Therefore, stirring resistance due to the ring gear 4 is reduced.

The supply opening 32 through which the lubricating oil OL is supplied to the tooth surface of the sun gear 2 is provided not in the baffle unit 5 as disclosed in Patent Document 1, but in the housing 9. Therefore, the internal space of the baffle unit 5 can be effectively used for collecting the lubricating oil OL. The circumferential width W of the first introduction opening portion 25 is greater than the minimum gap G between the two planet gears 3 and 3 adjacent to each other. Thus, the lubricating oil OL that flows between the planet gears 3 and 3 in the radially outward direction can be effectively introduced through the first introduction opening portion 25 into the baffle unit 5.

The first introduction opening portion 25 is disposed in the vicinity of the arrangement pitch circle 60 of the planet gears 3. A portion in the vicinity of the arrangement pitch circle 60 is greater than the minimum gap G between the planet gears 3 and 3, and is not distant from the sun gear. Therefore, after the sun gear is lubricated, the lubricating oil can be effectively introduced into the baffle unit through the first introduction opening portion disposed in the vicinity thereof.

The discharge opening portion 26 is formed in the end wall 30 shown in FIG. 3, and the attaching wall 31 provided at the other end portion of the radially outer end wall 33 is connected to the housing 9. The end wall 30 has the support portion 28, and thus has an increased dimension in the radial direction. Therefore, the discharge opening portion 26 formed in the end wall 30 can be increased to easily discharge the lubricating oil OL. The baffle unit 5 can be stably supported by the housing at the attaching wall 31.

Since the outlet hole 23 is formed in the ring member 19 shown in FIG. 2, the lubricating oil OL discharged through the discharge opening portion 26 of each baffle unit 5 is guided to outside of the ring member 19 from the outlet hole 23, so that the lubricating oil OL is not accumulated in the ring member 19. Therefore, stirring resistance of the lubricating oil OL caused by the rotation of the ring member 19 can be reduced.

In the housing 9, the nozzles 32 for injecting the lubricating oil toward the tooth surface of the sun gear 2, and the third supply passage 35C for supplying the lubricating oil OL to the bearing of each planet gear 3, are formed. The housing 9 does not rotate and is stationary, so that the lubricating oil OL is constantly and stably injected to the tooth surface of the sun gear 2 from the nozzles 32 provided in the housing 9. Similarly, the lubricating oil OL is constantly and stably supplied to the bearing 13 of each planet gear 3 by the third supply passage 35C provided in the housing 9.

Figure 4:
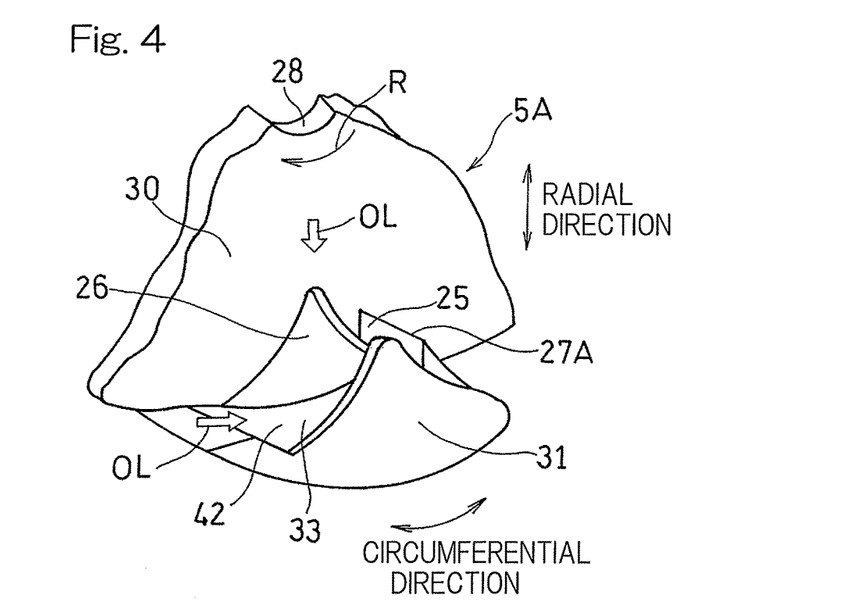
FIG. 4 is a perspective view of a baffle unit used in a second embodiment.

In the first embodiment, a baffle unit 5A shown in FIG. 4 may be used. The baffle unit 5A has a second introduction opening portion 42 formed at the side portion on the front side in the rotation direction R of the sun gear 2, and the guide portion 27B provided for the baffle unit 5 shown in FIG. 3 is not provided. In this second embodiment, in addition to the first introduction opening portion 25, the second introduction opening portion 42 is formed by the end wall 30, the attaching wall 31, the guide portion 27A, and the radially outer end wall 33. Therefore, in particular, the lubricating oil OL from the planet gear 3 as indicated by the arrow P2 in FIG. 1 can be efficiently collected into the baffle unit 5A. The lubricating oil OL to be collected in the second introduction opening portion 42 shown FIG. 4 is smoothly introduced into the second introduction opening portion 42 by being received by the guide portion 27A.

Figure 5:
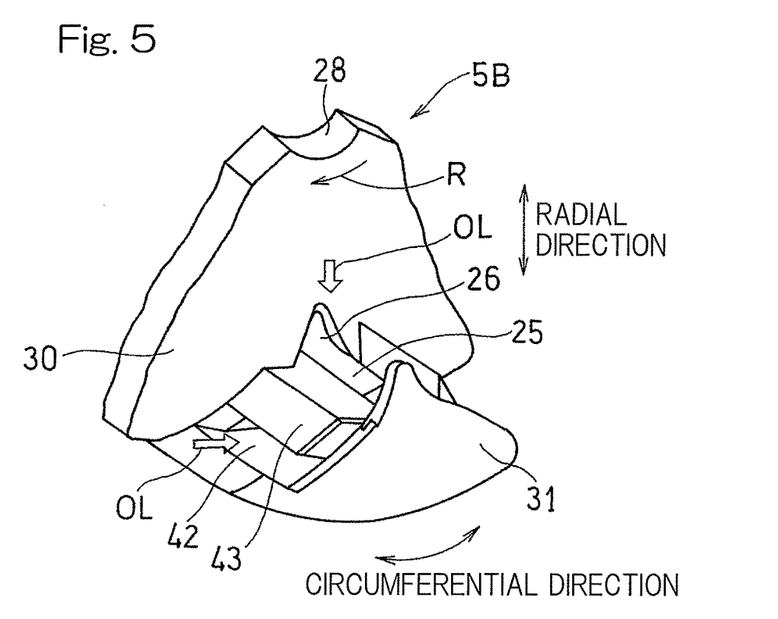
FIG. 5 is a perspective view of a baffle unit used in a third embodiment.

In the first embodiment, a baffle unit 5B shown in FIG. 5 may be used. The baffle unit 5B includes a distributor member 43 for guiding the lubricating oil OL along the outer circumference of the planet gear 3 (FIG. 1) that is adjacent thereto and is provided on the front side in the rotation direction R of the sun gear 2. The second introduction opening portion 42 is formed between the distributor member 43 and the radially outer end wall 33. In this third embodiment, in particular, the lubricating oil OL from the planet gear 3 as indicated by the arrow P2 in FIG. 1, can be separated by the distributor member 43 and can be introduced into the second introduction opening portion 42 with an enhanced efficiency.

Figure 6:
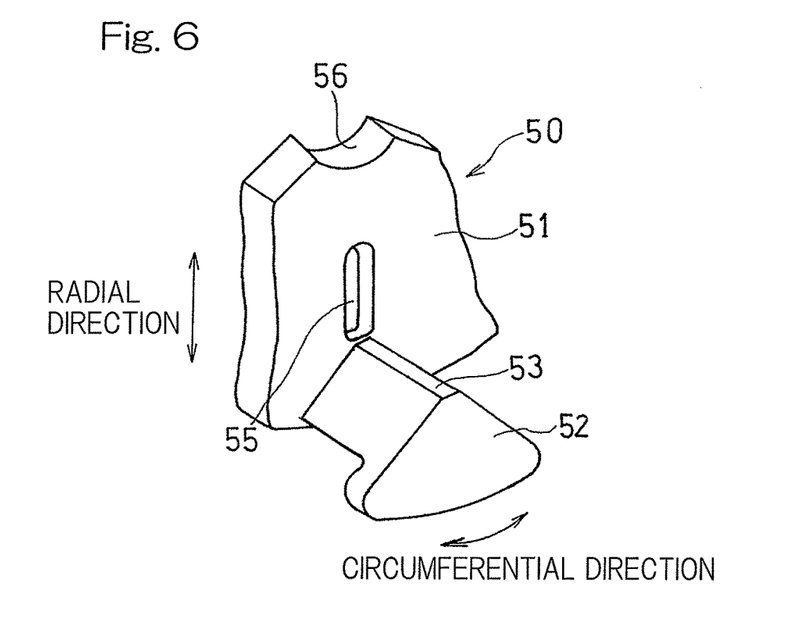
FIG. 6 is a perspective view of a baffle unit of comparative example.

Next, a result of an analysis of stirring loss of the planetary gear devices using the above-described three types of the baffle units 5, 5A, 5B and a baffle unit 50 as shown in FIG. 6 as comparative example, will be described. In the baffle unit 50 shown as comparative example in FIG. 6, a disk-shaped end wall 51 and a short attaching wall 52 that extends radially outward, are connected by a connecting portion 53 that extends in the axial direction. The end wall 51 has: a radially elongated opening 55 through which the lubricating oil OL is collected; and a support portion 56. The first introduction opening portion of the present invention is not provided. According to the result of the analysis, in a case where the stirring loss of comparative example shown in FIG. 6 was 100, the stirring loss was reduced by the baffle unit 5 shown in FIG. 3 to be lower, by 30%, than that of comparative example, the stirring loss was reduced by the baffle unit 5A shown in FIG. 4 to be lower, by 37%, than that of comparative example, and the stirring loss was reduced by the baffle unit 5B shown in FIG. 5 to be lower, by 47%, than that of comparative example. Thus, it has been proved that, when the baffle units 5, 5A, 5B of the present invention are used, the stirring loss is reduced, and power loss of the planetary gear device 1 is reduced.

As shown in FIG. 2, the output shaft 20 is supported by the support portion 28 formed in the end wall 30 of the baffle unit 5. Therefore, a bearing for supporting the output shaft 20 need not be separately provided, thereby simplifying the structure.

The end wall 30 of the baffle unit 5 has the support portion 28, and thus has an increased dimension in the radial direction. Therefore, the discharge opening portion 26 formed in the end wall 30 can be increased to easily discharge the lubricating oil. The baffle unit 5 is stably supported by the housing 9 through the fastening member 24 at the other end portion of the radially outer end wall 33.

Since the outlet hole 23 is formed in the ring member 19, the lubricating oil OL discharged through the discharge opening portion 26 of each baffle unit 5, is guided into the housing 9 from the outlet hole 23 of the ring member 29, and the lubricating oil OL is not accumulated at the ring member 19. Therefore, stirring resistance of the lubricating oil OL caused by the rotation of the ring member 19 can be reduced.

In the housing 9, the nozzles 32 for injecting the lubricating oil OL toward the tooth surface 3a of the sun gear 3; and the supply passage 35A for supplying the lubricating oil OL to the bearing 13 of each planet gear 3, are formed. Therefore, the lubricating oil OL can be stably injected, from the nozzles 32 provided in the housing 9 which does not rotate and is stationary, toward the tooth surface 2a of the sun gear 2, and the lubricating oil OL can be stably supplied also from the supply passage 35A to the bearing 13 of each planet gear 3. Further, the lubricating oil OL can be stably supplied to the slide bearing 39 of the support portion 28, through the discharge groove 36 in the baffle unit 5 in a stationary state, from the supply passage 35C formed in the housing 9.

Figure 7:
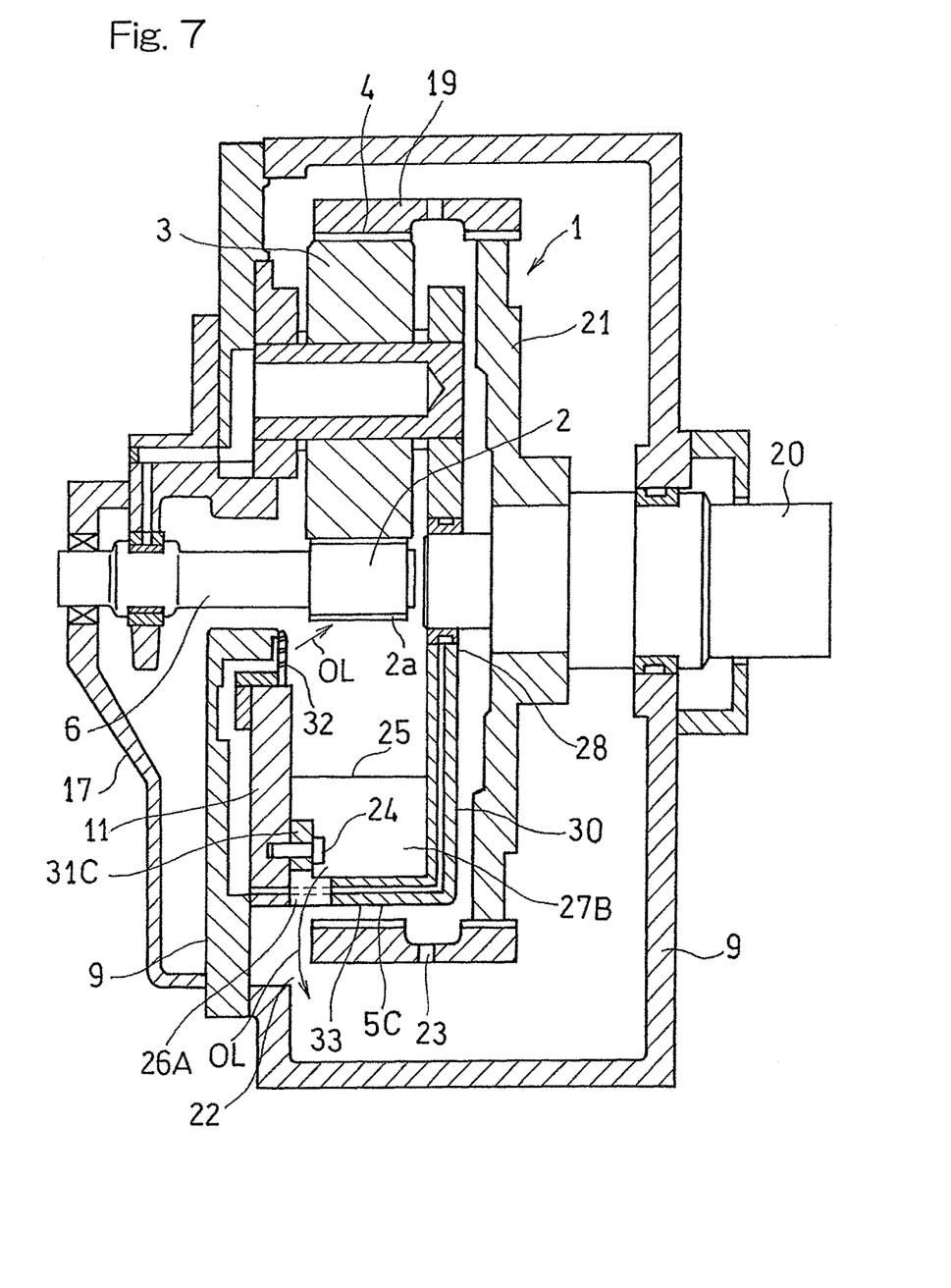
FIG. 7 is a longitudinal cross-sectional view illustrating a planetary gear device, which has a structure for distributing lubricating oil flow and is applied to an output device, according to a second embodiment of the present invention.

FIG. 7 shows a second embodiment. In this embodiment, a discharge opening portion 26A is formed in the vicinity of the other end portion (the left end portion in FIG. 7) of the radially outer end wall 33 of a baffle unit 5C, specifically, over an attaching wall 31C and the other end portion of the radially outer end wall 33 in the baffle unit 5C. The lubricating oil OL in the baffle unit 5C is discharged radially outward of the ring member 19 through the gap 22 between the ring member 19 and the housing 9, and the outlet hole 23 of the ring member 19.

Figure 8:
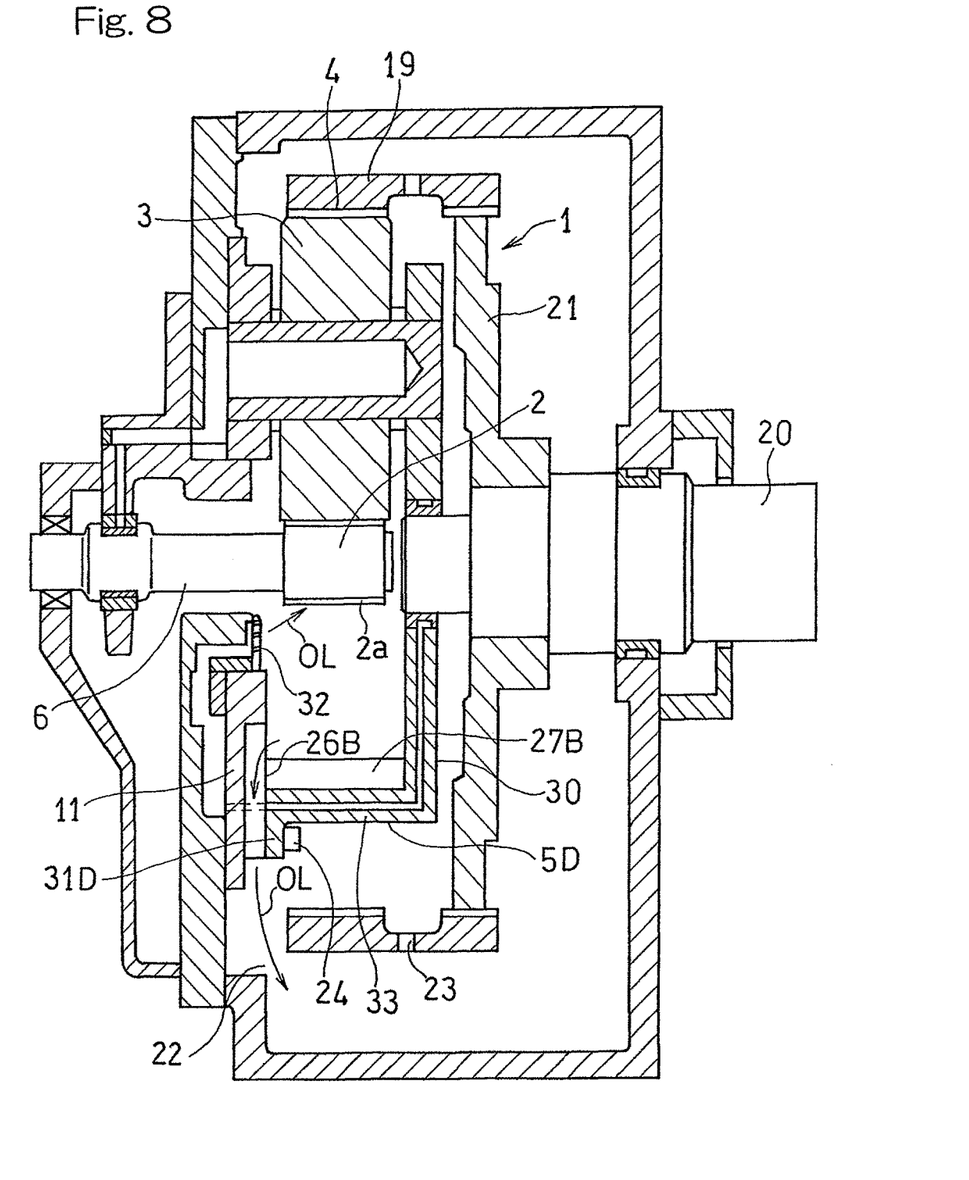
FIG. 8 is a longitudinal cross-sectional view illustrating a planetary gear device, which has a structure for distributing lubricating oil flow and is applied to an output device, according to a third embodiment of the present invention.

FIG. 8 shows a third embodiment. In this embodiment, an attaching wall 31D on the front side, in the axial direction, of a baffle unit 5D extends radially outward from the radially outer end wall 33, and is connected to the planet gear support plate 11 through the fastening member 24. The planet gear support plate 11 that is a part of the housing 9 has a groove formed at a portion corresponding to the inner side, in the radial direction, of the other end portion of the radially outer end wall 33, to form a discharge opening portion 26B. The lubricating oil OL in the baffle unit 5D is discharged from the discharge opening portion 26B through the gap 22 and the outlet hole 23 into the housing 9.

Although the present invention has been fully described in connection with the preferred embodiments thereof with reference to the accompanying drawings, numerous additions, changes, and deletions can be made without departing from the gist of the present invention. For example, the discharge opening portions 26 may be formed in both of the two walls 30 and 31 of the baffle unit 5. Therefore, these are construed as included within the scope of the present invention.

REFERENCE NUMERALS

1 . . . Planetary gear device
2 . . . Sun gear
2a . . . Tooth surface
3 . . . Planet gear
3a . . . Tooth surface
4 . . . Ring gear
5, 5A to D . . . Baffle unit
6 . . . Input shaft
9 . . . Housing
19 . . . Ring member
20 . . . Output shaft (Rotary shaft)
22 . . . Gap
23 . . . Outlet hole
25 . . . First introduction opening portion
26 . . . Discharge opening portion
27A, 27B . . . Guide portion
28 . . . Support portion
30 . . . End wall
31 . . . Attaching wall
33 . . . Radially outer end wall
35A to 35C . . . Supply passage
42 . . . Second introduction opening portion
43 . . . Distributor member
OL . . . Lubricating oil

What is claimed is:

1. A planetary gear device comprising:
   a sun gear having external teeth;
   a plurality of planet gears that have external teeth and mesh with the sun gear;
   a ring gear that has internal teeth and meshes with the planet gears; and
   a baffle unit disposed in a circumferential gap defined between the planet gears adjacent to each other,
   the baffle unit including:
   a first introduction opening portion that is open in a radially inward direction, and configured to introduce lubricating oil into the baffle unit after the lubricating oil has lubricated tooth surfaces of the sun gear and tooth surfaces of the planet gears;
   a radially outer end wall that is disposed in a vicinity of a radially inner side of the ring gear;
   an end wall disposed at one end portion of the radially outer end wall and forming one end, in an axial direction, of the first introduction opening portion;
   a discharge opening portion to discharge the lubricating oil in the baffle unit; and
   a guide portion disposed at least at a side portion of the baffle unit on a rear side in a rotation direction of the sun gear, and configured to cover the first introduction opening portion in the circumferential direction, and to guide the lubricating oil into the first introduction opening portion,
   wherein a circumferential width of the first introduction opening portion is configured to be greater than a minimum gap between two planet gears adjacent to each other.

2. The planetary gear device as claimed in claim 1, wherein a housing or a rotary shaft of the sun gear has a supply opening to supply the lubricating oil to the tooth surfaces of the sun gear.

3. The planetary gear device as claimed in claim 1, wherein the first introduction opening portion is disposed in a vicinity of an arrangement pitch circle of the planet gears.

4. The planetary gear device as claimed in claim 1, wherein the baffle unit has a second introduction opening portion formed on a radially inner side of the radially outer end wall, and at a side portion on a front side in a rotation direction of the sun gear.

5. The planetary gear device as claimed in claim 1, further comprising a housing that accommodates the sun gear, the planet gears, and the ring gear, wherein the discharge opening portion is formed at an opposite end portion of the radially outer end wall.

6. The planetary gear device as claimed in claim 1, further comprising a housing that accommodates the sun gear, the planet gears, and the ring gear, wherein the discharge opening portion is formed in a portion of the housing corresponding to a radially inner side of an opposite end portion of the radially outer end wall of the baffle unit.

7. The planetary gear device as claimed in claim 1, further comprising: a ring member having an inner circumferential surface formed with the ring gear; and a housing that accommodates the ring member, the sun gear, the planet gears, and the ring gear, wherein the ring member has an outlet hole to guide the lubricating oil discharged through the discharge opening portion of the baffle unit to outside of the ring member.

8. The planetary gear device as claimed in claim 1, wherein the guide portion extends in the radially inward direction from the first introduction opening portion.

9. The planetary gear device as claimed in claim 8, wherein an inner-most end of the guide portion is tapered.

10. A planetary gear device comprising:
    a sun gear having external teeth;
    a plurality of planet gears that have external teeth and mesh with the sun gear;
    a ring gear that has internal teeth and meshes with the planet gears; and
    a baffle unit disposed in a circumferential gap defined between the planet gears adjacent to each other,
    the baffle unit including:
    a first introduction opening portion that is open in a radially inward direction, and configured to introduce lubricating oil into the baffle unit after the lubricating oil has lubricated tooth surfaces of the sun gear and tooth surfaces of the planet gears;
    a radially outer end wall that is disposed in a vicinity of a radially inner side of the ring gear;
    an end wall disposed at one end portion of the radially outer end wall and forming one end, in an axial direction, of the first introduction opening portion;
    a discharge opening portion to discharge the lubricating oil in the baffle unit;
    a guide portion disposed at least at a side portion of the baffle unit on a rear side in a rotation direction of the sun gear, and configured to cover the first introduction opening portion in the circumferential direction, and to guide the lubricating oil into the first introduction opening portion; and
    a distributor member disposed on a front side in the rotation direction of the sun gear and configured to guide the lubricating oil along an outer circumference of the planet gear that is adjacent thereto,
    wherein the baffle unit has a second introduction opening portion formed between the distributor member and the radially outer end wall so as to be located on a radially inner side of the radially outer end wall, and at a side portion on the front side in the rotation direction of the sun gear.

11. A planetary gear device comprising:
a sun gear having external teeth;
a plurality of planet gears that have external teeth and mesh with the sun gear;
a ring gear that has internal teeth and meshes with the planet gears; and
a baffle unit disposed in a circumferential gap defined between the planet gears adjacent to each other,
the baffle unit including:
a first introduction opening portion that is open in a radially inward direction, and configured to introduce lubricating oil into the baffle unit after the lubricating oil has lubricated tooth surfaces of the sun gear and tooth surfaces of the planet gears;
a radially outer end wall that is disposed in a vicinity of a radially inner side of the ring gear;
an end wall disposed at one end portion of the radially outer end wall and forming one end, in an axial direction, of the first introduction opening portion;
a discharge opening portion to discharge the lubricating oil in the baffle unit; and
a guide portion disposed at least at a side portion of the baffle unit on a rear side in a rotation direction of the sun gear, and configured to cover the first introduction opening portion in the circumferential direction, and to guide the lubricating oil into the first introduction opening portion,
wherein the end wall of the baffle unit is formed with a support portion configured to support a rotary shaft that is disposed so as to be concentric with the sun gear and rotates integrally with the ring gear.

12. The planetary gear device as claimed in claim 11, further comprising a housing that accommodates the sun gear, the planet gears, and the ring gear, wherein the discharge opening portion is formed in the end wall, and an opposite end portion of the radially outer end wall is provided with an attaching wall connected to the housing.

13. A planetary gear device comprising:
a sun gear having external teeth;
a plurality of planet gears that have external teeth and mesh with the sun gear;
a ring gear that has internal teeth and meshes with the planet gears;
a baffle unit disposed in a circumferential gap defined between the planet gears adjacent to each other,
the baffle unit including:
a first introduction opening portion that is open in a radially inward direction, and configured to introduce lubricating oil into the baffle unit after the lubricating oil has lubricated tooth surfaces of the sun gear and tooth surfaces of the planet gears;
a radially outer end wall that is disposed in a vicinity of a radially inner side of the ring gear;
an end wall disposed at one end portion of the radially outer end wall and forming one end, in an axial direction, of the first introduction opening portion;
a discharge opening portion to discharge the lubricating oil in the baffle unit; and
a guide portion disposed at least at a side portion of the baffle unit on a rear side in a rotation direction of the sun gear, and configured to cover the first introduction opening portion in the circumferential direction, and to guide the lubricating oil into the first introduction opening portion;
a housing that accommodates the sun gear, the planet gears, and the ring gear,
wherein the housing includes: a nozzle configured to inject the lubricating oil toward the tooth surfaces of the sun gear; and a supply passage to supply the lubricating oil is supplied to a bearing of the planet gear.

* * * * *